United States Patent [19]
Durst

[11]  4,456,625
[45]  Jun. 26, 1984

[54] STORAGE STABLE, READY-TO-EAT BAKED GOODS
[75] Inventor: Jack R. Durst, Champlin, Minn.
[73] Assignee: The Pillsbury Company, Minneapolis, Minn.
[21] Appl. No.: 388,069
[22] Filed: Jun. 14, 1982
[51] Int. Cl.$^3$ .................... A21D 10/02; A21D 13/00
[52] U.S. Cl. ................................ 426/106; 426/128; 426/549; 426/510; 426/325; 426/331
[58] Field of Search ............... 426/549, 325, 532, 128, 426/510, 106, 331

[56]  References Cited
U.S. PATENT DOCUMENTS 3,914,445  10/1975  Pavey ................................. 426/532
4,120,984  10/1978  Richardson ........................ 426/128
4,353,932  10/1982  Bone ................................... 426/553

Primary Examiner—Joseph M. Golian
Assistant Examiner—Elizabeth A. Hatcher
Attorney, Agent, or Firm—Robert J. Lewis; Michael D. Ellwein; Mart C. Matthews

[57]  ABSTRACT

Ready-to-eat baked goods which contain a substantial portion of non-gelatinized starch, and are shelf stable for up to one year, are disclosed. They are prepared from a flour containing base-batter mix, water, and at least 5% by weight of the product of an edible, liquid polyhydric alcohol. The water activity level of the baked good is equal to or less than 0.85, the ratio of total water to edible liquid, polyhydric alcohol is equal to or less than 4.8 and the ratio of flour to edible, liquid polyhydric alcohol is equal to or less than 5.6.

26 Claims, No Drawings

STORAGE STABLE, READY-TO-EAT BAKED GOODS

BACKGROUND OF THE DISCLOSURE

This invention relates broadly to baked, ready-to-eat flour containing products, such as those typically sold as packaged bakery products. Amongst the types of products which can be prepared in accordance with this invention are crumb-structured products such as cakes, dumplings, breads, bagels, refrigerated biscuits, quick breads, and the like. These products are all characterized in that they normally contain in the final baked good, nearly all gelatinized starch. In addition, the technology of this invention can be used to prepare brownies and cookies which are of higher sugar and lower water content than those previously described as crumb-structured, and are further characterized in that they are usually not as high in gelatinized starches.

One of the problems with preparing products of the type discussed above for pre-packaged shipment and sale, is that such products have a very short shelf life. This is a distinct disadvantage if one intends such products to compete with fresh bakery goods.

Products which have been previously baked and prepackaged and shipped for sale must, if they intend to compete with fresh-baked goods, mantain their fresh-baked characteristics. These characteristics include moistness, eating quality, tenderness, good taste and flavor, and generally all of those characteristics of high quality fresh-baked goods.

Providing such pre-baked and packaged products which are shelf stable to normal deterioration of these beforementioned desirable attributes, is not an easy task. It is known that "staling" occurs within a short period of time for fresh-baked goods. Thus, those prepared at a bakery for immediate sale have a very short shelf life, typically, a day or two, up to at most one week. Packaging can extent that shelf life somewhat, but again such products inevitably will stale in a short time if current technology is practiced. Such staling will typically occur within a week or two, at most.

"Staling", as used herein, refers to a phenomenon which involves many different physical and chemical factors. Amongst those are texture staling caused by recrystallization of the gelatinized starches, moisture drying, chemical changes causing flavor changes, and microbiological spoilage. Of particular importance here in the overall staling phenomenon is recrystallization of the starches.

As is known, during baking most of the starches of the type used in crumb-structured products, become gelatinized. That is to say, the starch swells, takes on water, the starch cell bursts and it loses its granule structure. However, over a period of time, the starch begins to crystallize in areas and assume a rigid structure, and some of the water in the starch migrates to the protein portion of the baked goods. This makes the product tougher, makes the crumb structure more rigid and gives the consumer the impression of a dried-out product, even though the moisture content is the same. This starch molecule recrystallization or realignment during storage is one of the main problems which destroys long shelf life for baked, packaged and shipped bakery products.

Accordingly, it is a primary objective of the present invention to prepare baked, ready-to-eat, packaged baked goods which are storage stable to provide a long shelf life, typically from one month up to as long as one year.

Another objective of the present invention is to prepare ready-to-eat baked goods of the type described, which retain high moistness, good eating quality and which in addition, contain high proportions of substantially ungelatinized starch, even in their fresh-baked condition.

Yet another object of this invention is to prepare crumb-structured baked goods containing high proportions of substantially ungelatinized starch, which have all the ready-to-eat characteristics of such equivalent fresh-baked products, which do in fact contain gelatinized starches.

Yet another object of the present invention is to prepare crumb-structured, ready-to-eat baked goods which have a high percentage of substantially ungelatinized starches, and which have a low water activity, are resistant to microbiological spoilage, and which also resist significant chemical changes during storage.

An even further object of the present invention is to prepare crumb-structured products of the type previously described, which can be upon a conventional flour base mix portion and a liquid portion, to be mixed with the base mix to form a batter or dough, with the liquid portion containing at least a 5% by weight level of a liquid edible polyhydric alcohol based upon the total weight of the cooked baked good.

A more specific objective of the present invention is to prepare products of this type described using the preferred edible liquid polyhydric alcohol, glycerine.

An even further objective is to prepare high sugar, low water products, like cookies and brownies, which also have much longer than usual shelf life.

The method and manner of accomplishing each of the above objectives, as well as others, will become apparent from the detailed description of the invention, which follows. Unless stated to the contrary, all percents as expressed herein, are % by weight.

SUMMARY OF THE INVENTION

Long shelf life, stable, crumb-structured, read-to-eat baked goods are prepared from a flour containing base batter mix portion, which itself is mixed with a liquid portion. The liquid portion to be mixed with the flour to form a batter or dough, containing at least 5% by weight of the total product of an edible liquid polyhydric alcohol, preferably glycerine. The water activity level of the baked good is equal to or less than 0.85, the ratio of total water in the baked good to the edible liquid polyhydric alcohol is equal to or less than 4.8 and the ratio of flour to the edible liquid polyhydric alcohol is equal to or less than 5.6.

A crumb-structured baked good, using a batter formulation having the properties just described, after baking, contains in predominant proportion, ungelatinized starch. it is therefore resistant to traditional staling; and yet the consumer perceives the product, even after long periods of time, as fresh, and of no discernible difference, when compared to fresh-baked bakery products.

DETAILED DESCRIPTION OF THE INVENTION

One of the more surprising features of the present invention is that the baked crumb-structured goods, when the invention is practiced, contain mostly ungelatinized starch. Heretofore it was not thought that a high quality baked good was possible with ungelatinized starch. This is particularly true with cakes and breads. However, if this invention is practiced, for crumb-structured products, like cakes and breads, the result is a product which has at least 80% ungelatinized starch. It is therefore resistant to starch retrogradation or recrystallization, because it never in fact gelatinized. And yet, the consumer perceives no significant difference between these products and comparison baked goods which do in fact contain gelatinized starches.

Production of the storage stable bakery products of this invention require certain changes to the composition of the batter or dough normally employed for preparing such products.

The expression, "flour containing base batter mix" as used herein, refers to typical batter or dough compositions for chemically leavened cakes, yeast leavened breads, and the like. Thus, for convenience of description, batter, as used herein, can mean so-called "cake batter" or "bread dough".

As is well known to those in the art of preparing culinary products, the precise formulation of the flour containing base batter mix will vary, depending upon the precise bakery product one seeks to make. However, generally a typical dry mix formulation will contain some portions of the following basic ingredients.

| FLOUR CONTAINING DRY BASE | |
|---|---|
| | Range of % Usage |
| Flour (high protein flour is used for breads) | 14–93 |
| Eggs | 0–9 |
| Sugar | 0–55 |
| Shortening | 0–55 |
| Yeast | 0–22 |
| Chemical Leavening | 0–7 |
| Salt | 0–3 |
| Flavoring | 0–60 |
| Other Minors such as preservatives, BHA, BHT, etc. | 0–1.5 |

This basic batter dry mix is added to other optional ingredients and a liquid portion such as water, to produce the desired specific product, as will be illustrated in the examples. The flour, as used herein, may be cereal flours, other grain flours, legume flours and the like.

In conventional processing, the batter dry mix is added to water and mixed to form a batter which is cooked. When the batter is cooked, it results in a cake, bread, etc. which contains substantially completely gelatinized starches.

As used herein, the term gelatinization refers to the point of gelatinization which is defined as follows:

1. Point of Gelatinization—the temperature at which starch cells, when heated in water, burst to produce soluble starch which, on cooling, sets as a jelly. The temperature varies according to the size and source of the starch cells.

The gelatinization of the starch in the product can be readily measured by microscopic techniques which are well known. This involves examination with a light microscope and actual observing of the unruptured starch granules. When this is done for conventional fresh-baked goods, like cakes, it reveals virtually substantially complete gelatinization. In accordance with this invention, as hereinafter described, the amount of gelatinization in the baked good will typically only be at a level of from about 10% to about 20%, meaning that from about 80% to 90% of the starch that is present is in an ungelatinized form. Heretofore it has not been known that one could prepare baked good products, such as cakes, with the starch in ungelatinized form.

Prior approaches to shelf stability have included film packaged cakes, canned cakes and the like. In the conventional canning process for prepackaged products, such as cakes, the batter may be placed in a can with the lid loosely clinch sealed, steam cooked and then hermetically sealed to provide a canned cake. Typically during the steam cooking, the product is retorted at say, 250° F. and 15 psi for about 30 minutes depending upon can size. While producing products of this type in hermetically sealed containers of all types, does preserve their shelf life for a short period of time, they are still subject to chemical starch retrogradation, and texture and flavor changes in a relatively short period of time, at most a few weeks. If this invention is practiced, such products will be stable for from about one month up to about one year.

In accordance with this invention, it has been discovered that if in the liquid portion of the batter from about 5% to about 15% by weight of the total baked product of an edible liquid polyhydric alcohol is used, the result will be that the product looks, feels and tastes like conventional ready-to-eat baked goods. However, upon a microscopic examination of the product to determine gelatinization, from 0% to 20% of the starch is gelatinized. As a result, the product is not susceptible to significant starch retrogradation, that is, recrystallization. This is so because the major portion of the starch has never in fact gelatinized. Moreover, the water activity level is lower than in conventional baked goods. This results in less susceptibility to microbial spoilage and other physical-chemical changes.

These desirable results are only achieved when certain critical parameters are met. Those are the following.

First, the amount of liquid edible polyhydric alcohol must be 5% or more, preferably 5% to 15% and most preferably from about 7% to about 10% by weight of the final baked product. The polyhydric alcohol must be liquid because it is completely miscible with water and acts to extend the moistness as if higher quantities of water were present in the baked good. It, of course, must also be edible. The preferred polyhydric alcohol is glycerine. In certain instances, it may be preferable to mix the glycerine with propylene glycol, or 1,3 butylene glycol.

The second critical factor is that the water activity ($A_w$) of the baked good must be equal to or less than 0.85, preferably equal to or less than 0.80. This water activity level is measured in the final product, after cooking by known standard measurement techniques.

The third critical factor is that the ratio of total water of the baked good to the edible liquid polyhydric alcohol must be equal to or less than 4.8, preferably 4.0 or less and most preferred 2.6 or less.

Fourth, and finally, the ratio of the flour of the baked good to the edible liquid polyhydric alcohol must be equal to or less than 5.6, preferably equal to or less than 4.5 and most preferred 2.6 or less.

Providing that these combinations of conditions are all achieved in the same crumb-structured product, the result will be a product which has all the appearances of conventional fresh-baked goods containing gelatinized starches, but which in fact contains only about 10% to about 20% starch gelatinization; and a product which has a shelf stability of from about one month up to about one year. This is very significant. Even with hermetically sealed products such as prior art produced canned cakes, the shelf stability before evidence of staling, has never exceeded a few weeks.

It is not known precisely why the combination of initial conditions expressed above result in the achievement of the significant advantages of this invention. However, while not wishing to be bound by any theory, it is believed that the edible liquid polyhydric alcohol, such as glycerine, at the high levels used in this invention, somehow functions to bind the lowered water that is present in such a manner that it prevents substantially complete gelatinization from occurring. The plasticizing property of the polyhydric alcohol in combination with the starches during cooking cooperatively allows the ungelatinized starch to function in substantially the same manner in the cooked bakery goods as gelatinized starches normally do. As a result, the consumer perceives no significant difference.

It should be mentioned at this point that lower levels of glycerine, such as the low levels commonly employed for humectant purposes, will not achieve the results of this invention. The results are achievable only if the level of edible liquid polyhydric alcohol is within the expressed range, and if the water activity level is equal to or less than 0.85, and the ratio of total water to edible liquid polyhydric alcohol equal to or less than 4.8, and finally, the ratio of flour to liquid polyhydric alcohol is equal to or less than 5.6. When these critical combinations of conditions are achieved, baked crumb-structured products can be prepared which have all the appearances of conventional products, but which contain only 10% to 20% gelatinized starches, and yet are perceived by the consumer as equal in every way to conventional ready-to-eat baked goods.

While the invention has particular usefulness in preparing canned cake products, it is also very suitable and useful for preparing other crumb-structured products as well.

A typical formulation comparison for this invention and a conventional cake mix, brownie/cookie mix, and doughs for breads, are set forth below:

The above table shows the formulation differences between cake type products, brownie/cookie type products, and bread type products. Each of these type products can be prepared in accordance with this invention, providing that the $A_w$, polyhydric alcohol, flour to polyhydric alcohol, and water to polyhydric alcohol ratios are adjusted to meet the criteria heretofore discussed.

With regard to ordinarily gelatinized products such as cakes and breads, shelf stability is achieved because, in this invention, gelatinization is substantially prevented, along with other chemical and microbiological changes. With regard to normally ungelatinized, low moisture, high sugar products like brownies and cookies, sugar cannot crystallize and other chemical changes are prevented.

Heretofore, it has been mentioned that the polyhydric alcohol may be a mixture of edible liquid polyhydric alcohols. For cakes, and breads, it has been found desirable, and therefore preferred, to employ a mixture of glycerine and propylene glycol. Up to 40% of the total amount of the polyhydric alcohol portion of the finished product can be propylene glycol, as long as the absolute amount does not exceed 2% of the weight of the finished product. When this is done, the low $A_w$ combination with the propylene glycol even prevents xerotrophic mold growth, avoiding the necessity for additional pasteurization. As a result, open baking followed by non-sterile packaging conditions can be used.

The following examples serve to illustrate, but not limit, this invention. They show use in preparing crumb-structured products such as pound cakes, carrot cake, bread, and finally brownies. Also shown is a comparison of those with fresh baked product. They are compared in terms of shelf storage stability, microbial spoilage, appearance and eating quality.

While the above description has been given with regard to batter mixes, it should also be understood that it is possible to employ this invention with a dry culinary mix product to which the consumer adds a measured amount of water.

The process of preparing these products is illustrated in the examples. Both the control and the invention products used identical conditions.

COMPARISON TABLE

| Ingredient % by wt. finished product | CAKE PRODUCT | | BROWNIE/COOKIE | | BREAD PRODUCTS | |
|---|---|---|---|---|---|---|
| | Typical (Range) | Invention (Pound Cake) | Typical (Range) | Invention (Brownie) | Typical (Range) | Invention |
| Flour | 14–33% | 24.89% | 20–50% | 2890 | 10–65% | 51% |
| Sugar | 15–38% | 25.7% | 20–40% | 29% | 0–14% | 3.2% |
| Shortening | 7–29.5% | 12.1% | 12–25% | 13.3% | 0–47.5% | 4.4% |
| Added Water | 0–27% | 10% | 0–10% | 3.6% | 0–30% | 4.4% |
| Egg, Whole | 10–27.5% | 14.1% | 5–12% | 8.6% | 0–11% | 0% |
| Leavening | 0–3% | .36% | 0–.3% | 0.11% | 0–5% | 1.7% |
| Yeast | 0% | 0% | 0% | 0% (incl.nuts) | 0–15% | 1.2% |
| Minors, (salt, flours, etc.) | 0–5% | 2.7% | 0–5% | 9.9% | 0–5% | 4.3% |
| Polyhydried alcohol) | 0% | 10.3% | 0% | 7.5% | 0% | 10% |
| Total Water | 17–36% | 25.1% | 3.5–10% | 13.8% | 22–36.5% | 31.8% |

For cakes in a selected container, whether canned, plastic tray, paperboard or aluminum, the following standard procedure was used. The batter is placed on a release paper in the container, a cover slip is placed on the batter, and then the cover is sealed on the container. A small one-sixteenth inch hole is pierced in the center of the lid. The container is placed in an atmospheric steamer (210° F.) and heat processed until product temperature in the center of the container is 200° F. The containers are tilted approximately 30° to allow any condensate to run off and then the hole is covered with pressure sensitive tape. The extra leavening gases are vented through the hole, allowing the cakes to rise and flushing out any oxygen in the product container. When the cake has risen to fill the container, the cover slip plugs the hole, thus preventing any product contamination. The product, being hot, has a positive pressure which vents formed gases, and then while still hot (200° F.) and having a positive pressure, the pressure sensitive tape is applied effectively aseptically sealing the container. The containers are then allowed to cool at room temperature, leaving a small vacuum in the container.

EXAMPLE 1

A pound cake ($A_w$ 0.80) was prepared, having the following ingredients. It was prepared using the atmospheric steam process as described above.

| Ingredient | % | % $H_2O$ of Ingredient | % $H_2O$ Contributed to total |
|---|---|---|---|
| Cake Flour | 24.84 | 14 | 3.48 |
| Sugar | 25.68 | — | |
| Sweet Whey Solids | 1.20 | 3.5 | 0.04 |
| Vegetable Shortening | 6.87 | — | |
| Salt | 0.61 | — | |
| Flavors & Colors | 0.52 | 4 | 0.02 |
| Thickners | 0.38 | — | |
| Margarine | 5.20 | 15.5 | 0.81 |
| Whole Eggs | 14.07 | 73.7 | 10.37 |
| Glycerine | 10.27 | 4 | 0.41 |
| Chemical Leavening | .36 | — | — |
| Water | 10.00 | .00 | 10.00 |
| | 100.00 | | 25.13 |

The flour to glycerine ratio was 2.52. The water to glycerine ratio was 2.55, and as mentioned, the water activity was 0.8.

Prior to cooking the dry ingredients were thoroughly blended in a Hobart mixer, the shortening was melted, and the shortening, eggs, water and glycerine were added. Thereafter, mixing continued in the Hobart Mixer on #2 speed until homogeneous blending was noted. Thereafter, it was mixed at speed No. 3 for five minutes.

The processing time necessary to reach the 200° F. temperature outlined above was approximately 45 minutes to make a 275 gram cake.

In storage studies this product was initially compared with a pound cake prepared in exactly the same manner, except that the glycerine was replaced with water. The glycerine added product was examined for gelatinization and found to be only 10% gelatinized. The conventional product was 100% gelatinized. Aging studies were conducted using the pound cake of the invention and comparison with another fresh control pound cake of the invention in just-baked condition. Those results are shown in the Tables I and II below. Basically, the studies involve both cakes having been cooked under the conditions previously described and then stored under identical conditions at temperatures of 40°, 70°, 100° and 115° F. Periodically, they were checked for microbiological spoilage, visual comparison for evidence of deterioration and finally, a blind test expert panel tasted them to compare eating qualities. The test time varied from one week up to 38 weeks.

TABLE I

MICROBIOLOGICAL AND WATER ACTIVITY DETERMINATIONS ON ATMOSPHERIC STEAM PROCESSED POUND CAKES, IN 603 × 108 CANS.

| Time/ Weeks | Storage Temp. | TPC* | 35° C. Aerobic Spores | 35° C. Anaerobic Spores | 55° C. Anaerobic Spores | $A_w$ |
|---|---|---|---|---|---|---|
| 0 | Batch 1 | 17 | <3 | <3 | <3 | .78 |
| | Batch 2 | 7 | <3 | <3 | <3 | .79 |
| | Batch 3 | 3 | <3 | <3 | <3 | .03 |
| | Batch 4 | 3 | <3 | <3 | <3 | .30 |
| | Batch 5 | 13 | <3 | <3 | <3 | .34 |
| 2 | 115° F. | 3 | <3 | <3 | <3 | .03 |
| | 100° F. | 7 | <3 | <3 | <3 | .08 |
| | 70° F. | <3 | <3 | <3 | <3 | .05 |
| | 40° F. | 320 | <3 | <3 | <3 | .09 |
| | 0° F. | 7 | <3 | <3 | <3 | .05 |
| 4 | 115° F. | <3 | <3 | <3 | <3 | .34 |
| | 100° F. | <3 | <3 | <3 | <3 | .78 |
| | 70° F. | <3 | <3 | <3 | <3 | .35 |
| | 40° F. | 80 | <3 | <3 | <3 | .39 |
| | 0° F. | 7 | <3 | <3 | <3 | .70 |
| 6 | 115° F. | 17 | <3 | <3 | <3 | .37 |
| | 100° F. | 7 | <3 | <3 | <3 | .90 |
| | 70° F. | 13 | <3 | <3 | <3 | .32 |
| | 40° F. | 3 | <3 | <3 | <3 | .03 |
| | 0° F. | 13 | <3 | <3 | <3 | .30 |
| 8 | 115° F. | 3 | <3 | <3 | <3 | .05 |
| | 100° F. | 13 | <3 | <3 | <3 | .05 |
| | 70° F. | 7 | <3 | <3 | <3 | .06 |
| | 40° F. | 3 | ? | <3 | <3 | .05 |
| | 0° F. | 63 | <3 | <3 | <3 | .31 |
| 12 | 115° F. | 7 | <3 | <3 | <3 | .09 |
| | 100° F. | <3 | <3 | <3 | <3 | .70 |
| | 70° F. | 17 | - | <3 | <3 | .03 |

TABLE I-continued
MICROBIOLOGICAL AND WATER ACTIVITY DETERMINATIONS ON ATMOSPHERIC STEAM PROCESSED POUND CAKES, IN 603 × 108 CANS.

| Time/Weeks | Storage Temp. | TPC* | 35° C. Aerobic Spores | 35° C. Anaerobic Spores | 55° C. Anaerobic Spores | $A_w$ |
|---|---|---|---|---|---|---|
|  | 40° F. | <3 | <3 | <3 | <3 | .764 |
|  | 0° F. | 3 | <3 | <3 | <3 | .781 |
| 16 | 115° F. |  |  | NO SAMPLE |  |  |
|  | 100° F. | <3 | <3 | <3 | <3 | .765 |
|  | 70° F. | <3 | <3 | <3 | <3 | .734 |
|  | 40° F. | <3 | <3 | <3 | <3 | .755 |
|  | 0° F. | <3 | <3 | <3 | <3 | .773 |
| 20 | 115° F. |  |  | NO SAMPLE |  |  |
|  | 100° F. | <3 | <3 | <3 | <3 | .790 |
|  | 70° F. | <3 | <3 | <3 | <3 | .790 |
|  | 40° F. | 36 | <3 | <3 | <3 | .800 |
|  | 0° F. | 3 | <3 | <3 | <3 | .799 |
| 26 | 115° F. |  |  | NO SAMPLE |  |  |
|  | 100° F. |  |  | NO SAMPLE |  |  |
|  | 70° F. | 8 | 20 | 10 | 20 | .794 |
|  | 40° F. | 10 | <10 | <10 | <10 | .789 |
|  | 0° F. | 17 | 10 | <10 | <10 | .787 |
| 32 | 115° F. |  |  | NO SAMPLE |  |  |
|  | 100° F. | — |  | NO SAMPLE |  |  |
|  | 70° F. | 2 | 10 | <10 | <10 | .792 |
|  | 40° F. | 9 | 10 | <10 | <10 | .792 |
|  | 0° F. | 13 | 10 | <10 | <10 | .796 |
| 38 | 115° F. |  |  | NO SAMPLE |  |  |
|  | 100° F. |  |  | NO SAMPLE |  |  |
|  | 70° F. | <10 | 10 | <10 | <10 | .800 |
|  | 40° F. | <10 | <10 | <10 | <10 | .807 |
|  | 0° F. | <10 | <10 | <10 | <10 | .809 |

*Total plate count

As can be seen from an examination of Table I, the pound cake product of this invention as measured from 0 to 38 weeks, was initially low in bacterial counts, and the counts and the $A_w$ stayed constant over the entire time, showing $A_w$ and microbiological stability.

In studying the microbiological counts, microbiologists took samples from the centers of the cakes, in an aseptic manner, examined them under a microscope and used standard microbiological counting techniques.

Table II below shows the organoleptic and color evaluations.

TABLE II
ORGANOLEPTIC AND COLOR EVALUATIONS ON ATMOSPHERIC STEAM PROCESSED POUND CAKES OF EXAMPLE I

| Time/Weeks | STORAGE TEMPERATURE | | | | |
|---|---|---|---|---|---|
|  | 115° F. | 100° F. | 70° F. | 40° F. | 0° F. |
| 0 |  |  |  | Refrigerated until stored. High quality Moist, heavy texture cake with excellent flavor and golden color |  |
| 2 | Only very slight color change noted Acceptable as quality cake | Similar to control | Similar to control | Similar to control | Identical to description of sample at time 0. High quality cake |
| 4 | Only very slight color change. Very slightly less flavor than freezer control. Good Texture Acceptable | Very slight darkening of color Similar to control Acceptable | Similar to control | Similar to control | High quality cake |
| 6 | good texture, some flavor loss, more carmel flavor, color continuing to darken slightly  Acceptable. | Good texture, similar to frozen control. Flavor slightly less intense than control. Color has hint of darkening. Acceptable. | Texture, flavor and color is very similar to frozen control | Similar to control | High quality cake |
| 8 | Good texture and aroma, definitely changing in flavors, does not have pound cake flavor. Color continues to become browner. Borderline. | Good texture and flavor, although flavor is less intense. Color becoming slightly darker. Acceptable | Good color, texture and flavor. Quite similar to control. | Similar to control | High quality cake |
| 12 | Flavor old, carmel. Texture is slightly | Good texture. Color only slightly | Similar to control | Similar to control. | Maintains high quality. |

TABLE II-continued
ORGANOLEPTIC AND COLOR EVALUATIONS ON ATMOSPHERIC STEAM PROCESSED POUND CAKES OF EXAMPLE I

| Time/ Weeks | STORAGE TEMPERATURE | | | | |
|---|---|---|---|---|---|
| | 115° F. | 100° F. | 70° F. | 40° F. | 0° F. |
| | drier but good. Color changed to color of dry toast Not acceptable. | browning. Very slight flavor change. Acceptable. | | | |
| 16 | Samples depleted. | Good texture. Moist. Color only slightly darker. Flavor is carmelizing. Borderline | Similar to control | Similar to control | Maintains high quality |
| 20 | Samples depleted. | Good texture. Aromatic after taste which is disagreeable. Color becomdarker. Not acceptable. | Quite similar to control, with decrease in "pound cake" flavor. Acceptable | Similar to control. | High quality cake. |
| 26 | Samples depleted. | Samples depleted. | Good flavor and texture with only slight darkening of color. Acceptable | Similar to control. | High quality cake. |
| 32 | Samples depleted. | Samples depleted | Similar to control. Very slight darkening of color and flavor changes. Acceptable | Similar to control. | High quality cake. |
| 38 | Samples depleted | Samples depleted. | Similar to control with very slight darkening of color, slight loss of "pound cake" flavor. Good texture. Acceptable. | Similar to control. | High quality cake. |

EXAMPLE 2

A cake in accordance with Example 1 was prepared with the following difference. The polyhydric alcohol remained at the level of 10.27% by weight; however, 20% of its polyhydric alcohol content was propylene glycol. The cake was processed in a conventional oven at 340° F. for 50 minutes, cooled and innoculated with xerotrophic mold spores, packaged in a sealed polyethylene bag and stored at room temperature. This cake has remained mold free and of high quality for 90 days, and is still in storage. A conventional formulated cake, processed the same way, molded and staled in eight days.

As can be seen, in every instance the product after long storage compared very favorably to the fresh product indicating again excellent long term stability.

EXAMPLE 3 (Carrot Cake)

| Ingredient | % | % H₂O of Ingredient | % H₂O Contrib. to total |
|---|---|---|---|
| Sugar | 21.72 | — | |
| Flour | 16.14 | 12 | 1.94 |
| Shortening, Emulsified | 4.68 | — | |
| Puffed Carrot granules | 1.20 | 4 | 0.05 |

-continued

| Ingredient | % | % H₂O of ingredient | % H₂O Contrib. to total |
|---|---|---|---|
| Starch | 1.09 | 12 | 0.13 |
| Salt | 0.42 | — | |
| Spices & coloring | 0.71 | * | 0.05 |
| Leavenings | 0.76 | — | |
| Thickeners | 0.12 | — | |
| Whole eggs | 14.28 | 73.7 | 10.52 |
| Oil | 5.80 | — | |
| Raisins | 6.94 | 18 | 1.25 |
| Nuts | 11.79 | 3.5 | 0.41 |
| Glycerine | 5.69 | 4 | 0.23 |
| Water | 8.66 | 100 | 8.66 |
| | 100.00 | | 23.24 |

The water activity level was 0.8. The flour to glycerine ratio was 3.16 and the water to glycerine ratio was 4.26.

The basic make-up procedure was the same as in the previous example. The steaming process was approximately 63 minutes to make a 370 gram cake.

The following Table III shows the microbiological and water activity determinations for the product for periods of zero weeks up to 38 weeks.

Table IV shows organoleptic and color evaluations by an expert panel in accordance with the procedure discussed in Example 1.

TABLE III

MICROBIOLOGICAL AND WATER ACTIVITY DETERMINATION ON ATMOSPHERIC STEAM PROCESSED CAKES IN 603 × 108 CANS. CARROT CAKE WITH RAISINS AND NUTS

| Time/ Weeks | Storage Temperature | TPC | 35° C. Aerobic Spores | 35° C. Anaerobic Spores | 55° C. Anaerobic Spores | $A_w$ |
|---|---|---|---|---|---|---|
| 0 | Batch 1 | 27 | <3 | <3 | <3 | .805 |
|  | Batch 2 | 180 | <3 | <3 | <3 | .817 |
|  | Batch 3 | 33 | <3 | <3 | <3 | .796 |
|  | Batch 4 | 160 | <3 | <3 | <3 | .802 |
|  | Batch 5 | 77 | <3 | <3 | <3 | .813 |
|  | Batch 6 | 230 | <3 | <3 | <3 | .814 |
| 2 | 115° F. | 330 | <3 | <3 | <3 | .809 |
|  | 100° F. | 20 | <3 | <3 | <3 | .814 |
|  | 70° F. | 100 | <3 | <3 | <3 | .823 |
|  | 40° F. | 110 | <3 | <3 | <3 | .819 |
|  | 0° F. | 53 | <3 | <3 | <3 | .816 |
| 4 | 115° F. | 50 | <3 | <3 | <3 | .827 |
|  | 100° F. | 3 | <3 | <3 | <3 | .795 |
|  | 70° F. | 100 | <3 | <3 | <3 | .812 |
|  | 40° F. | 53 | <3 | <3 | <3 | .800 |
|  | 0° F. | 43 | <3 | <3 | <3 | .805 |
| 6 | 115° F. | 350 | <3 | <3 | <3 | .803 |
|  | 100° F. | 23 | <3 | <3 | <3 | .787 |
|  | 70° F. | 630 | <3 | <3 | <3 | .805 |
|  | 40° F. | 210 | <3 | <3 | <3 | .825 |
|  | 0° F. | 90 | <3 | <3 | <3 | .794 |
| 8 | 115° F. | 27 | <3 | <3 | <3 | .807 |
|  | 100° F. | 40 | <3 | <3 | <3 | .799 |
|  | 70° F. | 110 | 3 | <3 | <3 | .808 |
|  | 40° F. | 830 | <3 | <3 | <3 | .809 |
|  | 0° F. | 200 | <3 | <3 | <3 | .810 |
| 12 | 115° F. | <3 | <3 | <3 | <3 | .768 |
|  | 100° F. | 7 | <3 | <3 | <3 | .780 |
|  | 70° F. | 57 | 53 | 10 | <3 | .781 |
|  | 40° F. | 47 | 20 | <3 | <3 | .806 |
|  | 0° F. | 583 | 350 | 3 | <3 | .791 |
| 16 | 115° F. | <3 | <3 | <3 | <3 | .822 |
|  | 100° F. | 10 | 3 | 3 | <3 | .820 |
|  | 70° F. | 30 | 7 | <3 | <3 | .749 |
|  | 40° F. | 113 | 30 | <3 | <3 | .788 |
|  | 0° F. | 27 | 7 | <3 | <3 | .794 |
|  | 115° F. |  | SAMPLES DEPLETED |  |  |  |
| 20 | 100° F. | 122 | <3 | <3 | <3 | .802 |
|  | 70° F. | 26 | <3 | <3 | 6 | .808 |
|  | 40° F. | 59 | 3 | <3 | <3 | .822 |
|  | 0° F. | 69 | 17 | <3 | <3 | .823 |
|  | 115° F. |  | NO SAMPLE |  |  |  |
|  | 100° F. |  | NO SAMPLE |  |  |  |
| 26 | 70° F. | 60 | 120 | 70 | 10 | .799 |
|  | 40° F. | 40 | 170 | 60 | 30 | .805 |
|  | 0° F. | 70 | 380 | 150 | 40 | .818 |
|  | 115° F. |  | NO SAMPLE |  |  |  |
|  | 100° F. |  | NO SAMPLE |  |  |  |
| 32 | 70° F. | 60 | 110 | 10 | 10 | .826 |
|  | 40° F. | 110 | 50 | 20 | 20 | .818 |
|  | 0° F. | 70 | 100 | 50 | 30 | .823 |
|  | 115° F. |  | NO SAMPLE |  |  |  |
|  | 100° F. |  | NO SAMPLE |  |  |  |
| 38 | 70° F. | 10 | 90 | <10 | 20 | .814 |
|  | 40° F. | 40 | 30 | 20 | 10 | .820 |
|  | 0° F. | 30 | 40 | 10 | <10 | .830 |

TABLE IV

ORGANOLEPTIC AND COLOR EVALUATIONS ON CARROT CAKE OF EXAMPLE II
CARROT CAKE WITH RAISINS AND NUTS

| Time/ Weeks | STORAGE TEMPERATURE | | | | |
|---|---|---|---|---|---|
|  | 115° F. | 100° F. | 70° F. | 40° F. | 0° F. |
| 0 |  |  |  | Dense, moist high quality cake. Distinct spice flavor. Golden brown. color with flecks of orange carrot pieces throughout |  |
| 2 | Similar to control | Similar to control | Similar to control | Similar to control | High quality cake. Excellent flavor, color and eating |

TABLE IV-continued
ORGANOLEPTIC AND COLOR EVALUATIONS ON CARROT CAKE OF EXAMPLE II
CARROT CAKE WITH RAISINS AND NUTS

| Time/ Weeks | STORAGE TEMPERATURE | | | | |
|---|---|---|---|---|---|
| | 115° F. | 100° F. | 70° F. | 40° F. | 7° F. |
| 4 | Very slight darkening of color noted. Nuts appear slightly darker-but flavor not changed. Flavor of spices seem more intense. Acceptable | Texture and flavor excellent. Very slight darkening of crumb, raisins and nuts | Similar to control | Similar to control | High quality cake |
| 6 | Good texture. Crumb structure continues to darken. Browning of raisins and nuts. Only slight flavor changes. No rancidity of nuts. Acceptable | Some darkening of total cake, including nut, raisins & carrot pieces. Good texture. Flavor has changed but does not have an "off" flavor. Acceptable | Similar to control | Similar to control | High quality cake |
| 8 | Texture somewhat drier. Color changes more pronounced. Flavor changes; hint of molasses, and stronger spice, more like overcooked fruit cake. Not acceptable. | Good flavor and texture. Very little darkening of cake since last pulled though nuts and raisins have darkened. Acceptable | Similar to control | Similar to Control | High quality cake |
| 12 | Cake has become quite brown. Has flavor of overcooked fruit cake. Texture is slightly drier. Nuts do not taste rancid, but color has darkened. Edible Not acceptable. | Very slight darkening of crumb structure as well as nuts, raisins and carrot pieces. Texture good. Flavor becoming more like fruit cake but edible. Acceptable. | Similar to control | Similar to Control | High quality cake. |
| 16 | Very dark brown color. Flavor of overcooked fruit cake with a bitter burned taste. Texture becoming very dry. Not acceptable. | Good texture, however somewhat drier. Color somewhat darker. Carrot pieces appear orange. Flavor beginning to resemble fruit cake rather than carrot cake. Borderline | Similar to control Acceptable. | Similar to Control | High quality cake |
| 20 | Samples depleted. | Color becoming very brown. Texture satisfactory. Flavor of overcooked fruit cake. Not acceptable. | Good texture and only slight darkening of crumb structure. Very slight flavor loss. Acceptable. | Similar to control | High quality cake Unchanged. |
| 26 | Samples depleted | Samples depleted | Very slight darkening of crumb. Texture excellent Flavor good. Acceptable. | Similar to control | High quality cake |
| 32 | Samples depleted | Samples depleted | Good color, flavor and texture, only minor color change and very slight flavor change. Acceptable | Similar to control | High quality cake |
| 38 | Samples depleted | Samples depleted | Very slightly darker color. Nuts of good flavor and crunchy. Flavor more like spice cake. Texture excellent. Acceptable. | Similar to control | High quality cake |

The amount of starch gelatinization in the control was 100%. The amount of starch gelatinization in the product of the invention was 10%.

EXAMPLE 4

A bread utilizing the invention was prepared. The bread was a typical sponge dough bread formulation. The sponge dough bread formula was as follows:

| Ingredients | % | % $H_2O$ in Ingredient | % $H_2O$ Contrib. to total |
|---|---|---|---|
| Bread flour | 30.00 | 14 | 4.20 |
| Water | 18.00 | 100 | 18.00 |
| Yeast (Dry active) | 1.21 | 5 | 0.06 |
| Sugar | 0.22 | | |

| Ingredients | % | % H₂O in Ingredient | % ₂O Contrib. to total |
|---|---|---|---|
| | 49.43 | | |

The sponge dough formulation was prepared into a bread dough batter or dough mix in accordance with the following:

| Ingredient | % | % H₂O in Ingredient | % H₂O Contrib. to total |
|---|---|---|---|
| Bread flour | 21.00 | 14 | 2.94 |
| Shortening | 4.40 | — | |
| Non-fat milk solids | 2.20 | 3.5 | 0.08 |
| Sugar | 3.00 | — | |
| Salt | 2.00 | — | |
| Myvatex (dough conditioner monoglyceride) | 0.11 | — | |
| Glycerine | 8.50 | 4 | 0.34 |
| Propylene glycol | 1.50 | — | |
| Sodium Bicarbonate | 0.60 | — | |
| Glucona delta Lactone | 1.10 | — | |
| Water | 6.16 | 100 | 6.16 |
| | 50.57 | | 31.78 |

The flour to liquid polyhydric alcohol ratio was 5.28. The water activity level was 0.843. The water to liquid polyhydric alcohol ratio was 3.29.

In the sponge process, the sugar from the sponge formulation was dissolved in water at 110° F. to disperse it, and the active dry yeast was then added and dispersed. The bread flour was placed in a Hobart mixer bowl and the sponge formula ingredients were added at mixing speed #1, using a dough hook for one minute. The mixer was stopped and the bowl scraped down, and then mixed at #2 speed for three additional minutes.

The dough was placed in a greased container and allowed to rise under fermenting conditions for four hours in a proofing cabinet set at 82° F. and an 85% relative humidity.

With regard to the bread dough formulation, all the dry ingredients were added to the Hobart mixing bowl and blended for one minute at #1 speed using a mixing paddle. Shortening was added and mixing was continued at #1 speed for one more minute. Thereafter, the mixing paddle was replaced with a dough hook, water, glycerine and propylene glycol were added while mixing at #1 speed for one more minute. The mixer was stopped, scraped down and mixing continued at #2 speed for an additional minute.

Thereafter, the sponge which had been fermented for the four hours was mixed in for 4½ minutes to develop the gluten. This was then formed into 800 gram loaves and placed in a greased 9×5 inch bread baking pan. It was placed in a proofing cabinet at 108° F. and 88% relative humidity and proofed until the product rose to the top of the pan, which was approximately 1½ hours.

It was then placed in an atmospheric steamer and steamed until it reached a center temperature of 205° F. which was approximately 50 minutes. Thereafter, it was allowed to air cool to room temperature for 30 minutes. Melted butter was then placed on the surface and the surface was browned by heating in an oven set at 450° F. for six minutes. It was then removed from the pan and air cooled to room temperature. The bread was then packaged in polyethylene bags, using tie closures.

The resulting product had good eating quality, and was evaluated as a slightly dense, soft-textured bread. It had a water activity level at this stage of 0.84 and a pH of 6.45.

The bread remained soft and had good eating quality when stored at room temperature for 41 days, and is still in storage.

The percent gelatinization in the product was about 20%.

EXAMPLE 4

A brownie was prepared in accordane with this invention, having the following ingredients:

| Ingredient | % | % H₂O in Ingredient | % H₂O Contrib. to total |
|---|---|---|---|
| Flour | 27.96 | 12 | 3.36 |
| Sugar | 29.02 | — | |
| Cocoa | 3.62 | 5 | 0.18 |
| Shortening | 5.56 | — | |
| Vegetable Oil | 7.72 | — | |
| Salt | 0.56 | — | |
| Vanilla Flavor | 0.11 | — | |
| Sodium Bicarbonate | 0.11 | — | |
| Whole Eggs | 8.32 | 73.7 | 6.13 |
| Water | 3.62 | 100 | 3.62 |
| Glycerine | 7.50 | 4 | 0.30 |
| Walnuts | 5.90 | 3.5 | 0.21 |
| | 100.00 | | 13.80 |

The flour to glycerine ratio was 3.88. The water to glycerine ratio was 1.92. The water activity level was 0.66.

The brownie was prepared in accordance with the following procedure. Dry ingredients were placed in a Hobart mixer along with the shortening. They were mixed at #1 speed for one minute using a paddle.

Thereafter, eggs, water, glycerine and the above described mix were mixed for an additional minute at #1 speed. The vegetable oil was added and mixing continued for one more minute at #1 speed. The walls were then scraped down and mixing was continued at #2 speed for three minutes. The walnuts were then added, and mixing continued at #1 speed for another one-half minute.

450 grams of the batter was placed into a 603×108 can with a release paper on the bottom. A release paper was placed on top of the batter. It was then sealed into the can with a 1/16 vent hole pierced in its center.

The sealed cans were placed in an atmospheric steamer at 210° F. and held there until the center of the product reached 200° F., which was approximately 75 minutes.

The cans were removed from the steamer and immediately the vent hole was covered with a sealing tape as described in other examples. They were thereafter allowed to cool to room temperature.

An excellent quality fudge brownie resulted that remained fresh with no starch staling or sugar crystallization. The sample has remained good and has so far been stored at room temperature for 10 months.

What is claimed is:

1. A lower moisture, storage stable, crumb-structured, ready-to-eat, baked good which contains at least 80% of starch in ungelatinized form, said baked good being made from a flour containing base batter or dough mix, water and at least 5% by weight of said product of a liquid edible polyhydric alcohol, said baked good comprising:

having a water activity level (Aw) of said baked good equal to or less than 0.85, the ratio of total water of said baked good to liquid polyhydric alcohol being equal to or less than 4.8, and the ratio of flour of said baked good to liquid polyhydric alcohol being equal to or less than 5.6.

2. The baked good of claim 1 wherein the amount of gelatinized starch in said baked good is within the range of from about 10% to about 20% of the starch content of said batter mix.

3. The baked good of claim 1 wherein said liquid polyhydric alcohol is glycerine.

4. The baked good of claim 1 wherein said liquid polyhydric alcohol is propylene glycol.

5. The baked good of claim 1 wherein said liquid polyhydric alcohol is a combination of glycerine and propylene glycol.

6. The baked good of claim 1 wherein the amount of said liquid polyhydric alcohol is within the range of from about 5% by weight of the baked product to about 15% by weight of the baked product.

7. The baked good of claim 6 wherein the amount of said liquid polyhydric alcohol is within the range of from about 7% by weight of said baked product to about 10% by weight of said baked product.

8. The baked good of claim 1 wherein the water acitivity level ($A_w$) is equal to or less than 0.80.

9. The baked good of claim 1 wherein the ratio of total water of said baked good to liquid polyhydric alcohol is equal to or less than 4.0.

10. The baked good of claim 9 wherein the ratio of total water of said baked good to liquid polyhydric alcohol is equal to or less than 2.6.

11. The baked good of claim 1 wherein the ratio of flour of said baked good to liquid polyhydric alcohol is equal to or less than 4.5.

12. The baked good of claim 1 wherein the ratio of flour to said baked good to liquid polyhydric alcohol is equal to or less than 2.6.

13. The baked good of claim 1 wherein said baked good is storage stable in a suitable container for at least one month, without any noticeable staling.

14. The baked good of claim 1 wherein said baked good is storage stable in a suitable container for from about one month to as long as one year without any noticeable staling.

15. The baked good of claim 1 wherein said product is a cake.

16. The baked good of claim 1 wherein said product is a bread.

17. The baked good of claim 5 wherein up to 40% of the total amount of the polyhydric alcohol content is propylene glycol, with the absolute amount of propylene glycol in said baked good not exceeding 2% by weight of the product.

18. A low moisture, storage stable, ready-to-eat baked good which is either a cookie or a brownie which contains at least 80% of starch in ungelatinized form, said baked good comprising:

a flour containing base batter mix, water, and at least 5% by weight of said product of a liquid edible polyhydric alcohol;

the water activity of level (Aw) of said baked good being equal to or less than 0.85, the ratio of total water of said baked good to liquid polyhydric alcohol being equal to or less than 4.8, and the ratio of flour of said baked good to liquid polyhydric alcohol being equal to or less than 5.6.

19. A method of making a lower moisture, high quality crumb-structured, ready-to-eat baked good of long shelf life and resistance to staling, which contains at least 80% of starch in ungelatinized form, said baked good comprising a flour containing base mix, and a liquid portion of water, and a liquid edible polyhydric alcohol said method comprising:

using as a portion of the liquid to be mixed with a flour base mix to prepare a batter or dough from said liquid edible polyhydric alcohol, preparing a batter or dough from said flour containing base mix, said water and said liquid edible polyhydric alcohol, and heat processing said batter or dough to cook said baked good, the amount of said polyhydric alcohol being sufficient to provide in said cooked baked good an Aw equal to or less than 0.85, a ratio of flour to liquid polyhydric alcohol equal to or less than 5.6, and a ratio of water to liquid polyhydric alcohol equal to or less than 4.8.

20. The method of claim 19 wherein said liquid edible polyhydric alcohol is glycerine.

21. The method of claim 19 wherein said liquid polyhydric alcohol is a combination of glycerine and propylene glycol.

22. The method of claim 19 wherein the amount of said edible liquid polyhydric alcohol is within the range of from about 5% by weight of the baked product to about 15% by weight of the baked product.

23. The process of claim 19 wherein said heat processing is atmospheric steam cooking, and includes:

filling a batter container and sealing said container, providing the container with a resealable vent, atmospheric steam cooking of the batter, sealing the vent, and cooling to ready the sealed container for case packing.

24. The process of claim 19 wherein said batter contains as said liquid edible polyhydric alcohol a mixture of glycerine and propylene glycol, with the absolute amount of propylene glycol in said baked good not exceeding 2% by weight of the baked good, and wherein said heat processing is conventional oven baking, and includes, filling a batter container, oven baking the batter filled container to cook the baked good, and cooling and wrapping the baked good to ready it for case packing.

25. The process of claim 19 wherein said heat processing is oven cooking, and includes:

filling a batter container and sealing said container, providing the container with a resealable vent, oven cooking of the batter, sealing the vent, and cooling to ready the sealed container for case packing.

26. The process of claim 19 wherein a dough is employed and the processing steps include:

forming said dough into a desired shape;

proofing said shaped dough;

cooking said shaped dough, and thereafter cooling and wrapping said cooked, shaped dough product.

* * * * *